FIP8102 OR 2,937,268

X325/361 BS
TX2650

May 17, 1960 W. J. DOWNIE ET AL 2,937,268

SYSTEM OF ANTENNA SELECTION BY RECEIVED CARRIER AMPLITUDE

Filed July 22, 1957 3 Sheets-Sheet 1

INVENTORS.
WILFRED J. DOWNIE
WILLIAM D. CRONCE
BY John A Duffy
AGENT

SYSTEM OF ANTENNA SELECTION BY RECEIVED CARRIER AMPLITUDE

Filed July 22, 1957 3 Sheets-Sheet 2

INVENTORS.
WILFRED J. DOWNIE
WILLIAM D. CRONCE
BY John A Duffy
AGENT

SYSTEM OF ANTENNA SELECTION BY RECEIVED CARRIER AMPLITUDE

INVENTORS.
WILFRED J. DOWNIE
WILLIAM D. CRONCE
BY John A. Duffy
AGENT

United States Patent Office 2,937,268
Patented May 17, 1960

2,937,268

SYSTEM OF ANTENNA SELECTION BY RECEIVED CARRIER AMPLITUDE

Wilfred J. Downie, Pacific Palisades, and William D. Cronce, Lawndale, Calif., assignors to North American Aviation, Inc.

Application July 22, 1957, Serial No. 673,389

8 Claims. (Cl. 250—13)

This invention relates to signal control systems and more particularly to a multiple antenna reception system for selecting the antenna receiving the greatest signal.

Aircraft reception of radio signals of sufficient strength to appear audible to the pilot is often difficult because of limitations in the aircraft communication systems. High frequency communication systems in today's aircraft have antennas which cannot receive a usable signal from all areas. It has not been practical to obtain full spherical coverage in an aircraft with one antenna due to the structural limitations of the antenna and the aircraft. For example, an antenna located in the nose of an aircraft may receive a strong signal from a transmitter located on the ground in a forward direction from the aircraft. As the aircraft passes over the transmitter station and changes position relative to the transmitter so that the transmitter is aft of the aircraft, the signal will start to fade. The effect of fading in high speed aircraft often seriously impairs the effectiveness of the entire communication system.

Selection systems for receiving signals at a plurality of antennas in aircraft have been utilized in the prior art to reduce the effect of fading and provide for greater versatility in communication systems. In the conventional method of selection systems with diversified antennas, the output of each antenna is supplied to a separate receiver with the outputs of all of the receivers being compared. A receiver is required for each antenna in addition to other complicated circuitry. In addition, the diversified method does not utilize the strongest signal received, but provides a comparison of all the signals which produces an average signal only at the receiver.

The present invention contemplates a multiple antenna communication system which automatically selects the antenna producing a predetermined signal of usable level and couples it to a single receiver. A minimum number of light-weight components combined to provide an automatic system which achieves a desired coverage by the communication system without the necessity of pilot monitoring. Automatic control is exercised over the antennas so that as soon as the signal strength of any antenna reaches a predetermined usable level, that antenna is automatically coupled to the receiver and remains coupled until such time as the signal strength falls below the usable level. In this manner, a usable signal is obtained without the necessity of comparing the signals from the antennas to obtain an average value.

It is therefore an object of this invention to provide an automatic reception system for aircraft communication.

It is another object of this invention to provide a reception system for automatically selecting the antenna of greatest signal strength.

It is still another object of this invention to provide a method for selectively sampling the outputs of a plurality of antennas in a reception system and automatically coupling the antenna of predetermined signal strength to the receiver.

It is a further object of this invention to provide a multiple antenna selector system which automatically samples antennas beginning with the antenna last producing the greatest signal.

It is a still further object of this invention to provide means for automatically locking the antenna of usable signal level to the receiver.

Other objects will become apparent from the following description together with the several figures of the drawings in which Fig. 1 is a block diagram illustrating the principal features of the invention;

Figure 1:
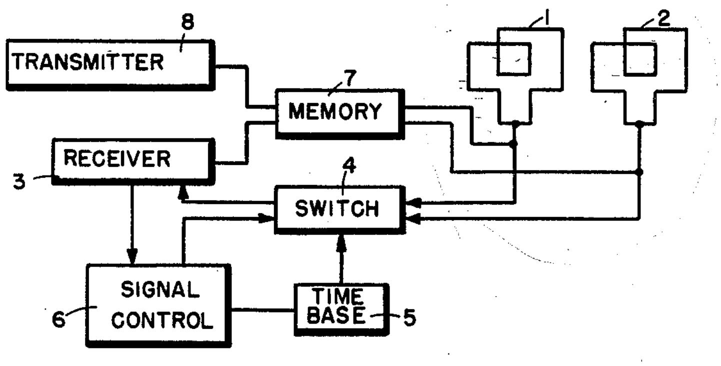

Referring now to Fig. 1, antennas 1 and 2 positioned in an aircraft to obtain optimum spherical coverage over a full 360° are alternately connected to receiver 3 through switch 4 which operates as a switching device in response to signals from time base 5 which may be, for example, a freerunning multivibrator. Antennas 1 and 2 are shown as loop antennas but may be of other types. Switch 4 has two states, in one of which antenna 1 is coupled to receiver 3, and in the other of which antenna 2 is coupled to receiver 3. As long as no signal of usable level is being received, antennas 1 and 2 are continuously sampled having their output monitored by receiver 3. Upon sensing a signal above a predetermined signal strength from one of the antennas receiver 3 actuates signal control 6 which decouples multivibrator 5 from switch 4 and maintains switch 4 in the state wherein the antenna producing the signal of predetermined strength is coupled to receiver 3. Receiver 3 remains locked on this antenna until such time as the signal from the antenna falls below the usable level. Signal control device 6 then couples multivibrator 5 to switch 4 and switch 4 resumes its sampling operation. A memory circuit 7 automatically couples receiver 3 and transmitter 8 to the antenna which last produced the signal of usable level. Coupling receiver 3 to the antenna last producing a usable signal enhances the chances for picking up a usable signal after the signal has faded. Coupling transmitter 8 to the antenna last producing a usable signal enables the transmitted signal to utilize the same antenna which produced the signal received. In this manner the pilot of the aircraft, for example, will always converse with the ground command radio over the same antenna. In operation, receiver 3 successively sampes the output signals from antennas 1 and 2 in accordance with the timing signal from multivibrator 5 until the signal strength from one of the antennas reaches the usable level. Receiver 3 is then locked on that antenna until the signal strength falls below the output level when receiver 3 will resume the sampling operation starting with the antenna last producing the signal strength of usable level receiving this information from memory circuit 7.

Figure 2:
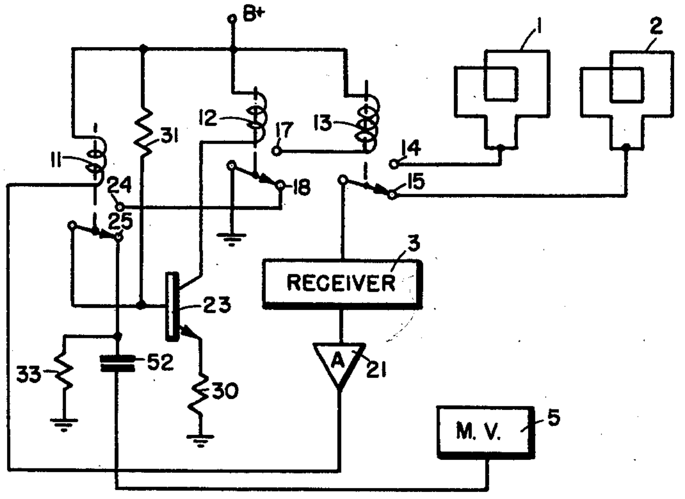
Fig. 2 is a schematic diagram illustrating a means for locking on the receiver to an antenna.

Referring now to Fig. 2, there is shown an embodiment of the invention illustrating in particular the means for locking the receiver to the antenna producing the signal of usable level. Antennas 1 and 2 are coupled to receiver 3 by relay 13 with antenna 1 connected to contact 14, which in turn is conductively connected to receiver 3 when relay 13 is energized and antenna 2 connected to contact 15 which is conductively connected to receiver 3 when relay 13 is de-energized. In order to better understand the operation of the relay circuitry, contact 14, which is normally open, will be referred to as an "energized" contact, pointing out the fact that when the coil of relay 13 is energized a current path exists through contact 14. Likewise, contact 15, which is normally closed will be referred to as a "de-energized" contact, pointing out that when the coil of relay 13 is de-energized, there is a current path through contact 15. This terminology will also be utilized with reference to other relays of the device with a normally open contact denoted as an energized contact and a normally closed contact called a de-energized contact.

Relay 13 is controlled by switching relay 12, having one terminal of its coil connected to energized contact 17 of relay 12 and the other terminal connected to the B+ of a D.-C. power supply. Energized contact 17 of relay 12 is conductively connected to ground when relay 12 is energized. Relay 12 is controlled by transistor 23 having one terminal of its coil connected to the collector of transistor 23 and the other terminal connected to B+. The base of transistor 23 is conductively connected to energized contact 24 when relay 11 is energized and to de-energized contact 25 when relay 11 is de-energized. Resistor 30 connects the emitter circuit of transistor 23 to ground and resistor 31 connects the base circuit to B+. Resistor 33, connected to de-energized contact 25, provides a circuit to ground for the base of transistor 23 when relay 11 is de-energized. Energized contact 24 of relay 11 and de-energized contact 18 of relay 12 provide a circuit to ground for the base of transistor 23 when relay 11 is energized and relay 12 is de-energized. Relay 11 is controlled by the output of receiver 3 through amplifier 21 with one terminal of its coil connected to the output of amplifier 21 and the other terminal connected to B+. The input of amplifier 21 is connected to receive a signal from receiver 3 and will present an amplified signal to energize the coil of relay 11 when receiver 3 receives a signal of usable level from either antenna 1 or antenna 2 as relay 13 alternately connects the antennas to receiver 3. Multivibrator 5 is coupled though capacitor 52 to de-energize contact 25 of relay 11.

In operation, for purposes of explanation, it will first be assumed that receiver 3 is sampling antennas 1 and 2 with no signal of usable level being received. During the sampling operation relay 11 is de-energized, receiving no signal from amplifier 21, relay 12 is alternately being energized and de-energized in response to signals from transistor 23, and relay 13 is also being alternately energized and de-energized in response to relay 12. Multivibrator 5 applies a signal through de-energized contact 25 of relay 11 to the base of transistor 23. Transistor 23 alternately conducts greater and lesser current in response to this signal, thereby alternately energizing and de-energizing relay 12. Relay 13, in response to the discontinuous signal from energized contact 17, alternately connects antennas 1 and 2 to receiver 3 through energized contact 14 and de-energized contact 15. Now assume that a signal of usable level is received by receiver 3 from one of the antennas. At the instant that receiver 3 is sampling the antenna producing the usable signal, receiver 3 provides a signal in response thereto through amplifier 21 which energizes relay 11. The circuit from multivibrator 5 to the base of transistor 23 is broken by contact 25 which opens when relay 11 is energized, removing multivibrator 5 from the base of transistor 23 and thereby stopping the switching action. Relay 11 is energized, relay 12 is locked in either the energized or de-energized position depending on which antenna is producing the usable signal. If antenna 1 is producing the signal of usable level, relay 12 is energized, having received an energizing signal from transistor 23. The base of transistor 23 is connected to B+ through resistor 31 thereby maintaining transistor 23 conducting and in turn relay 12 energized. Relay 12, locked in an energized position, locks relay 13, in a energized position through energized contact 17, and relay 13 through energized contact 14 locks antenna 1 to receiver 3. On the other hand, if antenna 2 is producing the signal of usable level, relay 12 is de-energized, having received no signal from transistor 23. The base of transistor 23 is now connected to ground through energized contact 24 of relay 11 and de-energized contact 18 of relay 12, thereby maintaining transistor 23 cut-off and in turn relay 12 de-energized. Relay 12, locked in a de-energized position, locks relay 13 in a de-energized position, which in turn locks antenna 2 to receiver 3. When the level of the signal received from antenna 1 falls below the predetermined usable level, relay 11, not receiving a signal of sufficient strength from amplifier 21 becomes de-energized, multivibrator 5 is again coupled to the base of transistor 23 and the switching action of relay 12 and in turn relay 13, and the sampling operation resumes and continues until a signal of usable level or strength is received from either of the antennas. In other words, when receiver 3 is sampling antennas 1 and 2 searching for a usable signal, multivibrator 5 is alternately presenting a conducting and non-conducting bias signal to the base of transistor 23. Relays 12 and 13 are alternately energized and de-energized and relay 11 remains de-energized. When a usable signal is received from antenna 1, relay 11 is energized. Transistor 23 is maintained conducting, relays 12 and 13 are locked in energized position, thus locking antenna 1 to receiver 3. When a usable signal is received from antenna 2, relay 11 is energized, transistor 23 is maintained non-conducting, and relays 12 and 13 are locked in a de-energized position, thus locking antenna 2 to receiver 3.

Figure 3:
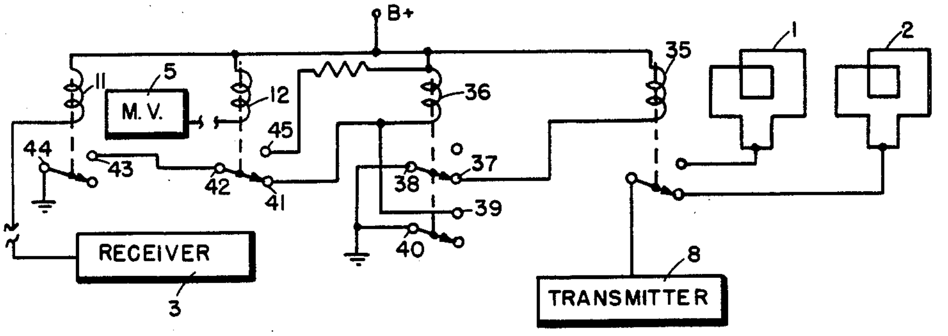
Fig. 3 is a schematic diagram illustrating the memory means in the invention for coupling the transmitter and the receiver to the antenna last producing a signal of usable level.

In order to insure transmission of a signal over the same antenna from which the immediately previous signal was received, a memory circuit is provided as shown in Fig. 3 which couples the transmitter to the antenna last producing a usable signal. In Fig. 3, for purposes of simplification, multivibrator 5 is shown as connected to the coil of relay 12 and receiver 3 is shown as connected to the coil of relay 11. Relay 13, which couples the signals from antennas 1 and 2 to receiver 3 is not shown. Transmitter 8 is coupled to antennas 1 and 2 by the energized and de-energized contacts of relay 35. Relay 35 has one terminal of its coil connected to de-energized contact 37 of memory relay 36 and the other terminal to B+. Contact 38 connects contact 37 to ground when relay 36 is de-energized. Energized contact 39 is connected to one terminal of relay 36 when relay 36 is energized. Contact 39 and 40 provide a circuit to ground for contact 37 and the terminal of relay 36. One terminal of relay 36 is also connected to de-energized contact 41 of relay 12. De-energized contact 42 of relay 12 connects contact 41 to energized contact 43 of relay 11 when relay 12 is de-energized. Contact 43 is connected to contact 44 and to ground when relay 11 is de-energized. Energized contact 45 of relay 12 is connected to B+. It is to be understood that the circuitry of Fig. 2 and Fig. 3 will cooperate to produce a desired result. However, in order to simplify the explanation, some of the circuitry common to both figures has been shown in only one figure. For example, relays 11 and 12 have two sets of contacts, one shown in Fig. 2 and the other in Fig. 3.

In operation of Fig. 3 when multivibrator 5 is controlling the sampling action of the device, antennas 1 and 2 are alternately coupled to receiver 3. Assume now, for explanation purposes, receiver 3, upon receipt of a signal of usable level from antenna 1 has energized relay 11 removing multivibrator 5 from the circuit as described in Fig. 2. Relay 12, being in an energized position, is maintained energized by the circuitry described in Fig. 2. Relay 36 is de-energized because of the circuit between one end of its terminal and ground established through contacts 45 and 42 of energized relay 12 and contacts 43 and 44 of energized relay 11, thus shorting the terminals of the coil of 36, preventing the relay from being energized. Relay 35 is energized by the connection of one of its terminals through contacts 37 and 38 of energized relay 36 to ground. Transmitter 8 is thus connected to antenna 1.

Assuming now it is desired to transmit, it is essential to transmit from the antenna which had received the last incoming signal regardless of the time lapse between reception and transmission. The signal from receiver 3 to relay 11 is removed by circuitry not shown in Fig. 3 but to be described later in connection with Fig. 5. Transmitter 8 is connected to antenna 1 which last produced a signal of usable level strength. If antenna 1 does not now have a signal of usable level strength, relay 35 will become de-energized, relay 36 being in an energized state.

In operation, assume a usable signal is obtained from antenna 1. Upon receipt of this usable signal, receiver 3 energizes relay 11. Relay 12 is locked in the energized position by the circuitry described in Fig. 2. Memory relay 36 is de-energized, the coil terminal connected to B+ being grounded through contacts 45 and 42 of relay 12 and contacts 43 and 44 of relay 11. Relay 35 is energized by the circuit from one coil terminal through contacts 37 and 38 to ground. When the signal from receiver 3 is removed, memory relay 36 remains de-energized, thus relay 36 in effect remembers that antenna 1 was producing the usable signal and thereby operates to cause transmitter 8 to be connected to transmit signals through antenna 1. Upon resumption of the sampling of antennas 1 and 2 by receiver 3, memory relay 36 remains de-energized until a usable level signal is received from either of the antennas. Assuming now a usable level signal is received from antenna 2, receiver 3 energizes relay 11. Relay 12 is now locked in the de-energized position by the circuitry described in Fig. 2. Memory relay 36 is energized by the circuit from B+ through the coil through contacts 41 and 42 of relay 12 and contacts 43 and 44 to ground. Once energized, relay 36 is held energized through contacts 39 and 40, contact 39 being connected through the coil to B+. Thus, when the signal from receiver 3 is removed, memory relay 36 remains energized. Relay 36 now remembers that antenna 2 is producing the usable level signal and operates to maintain transmitter 8 connected to transmit signals through antenna 2. Again upon resumption of sampling antennas 1 and 2 by receiver 3, memory relay 36 remains energized until a usable level signal is received from either of the antennas.

Figure 4:
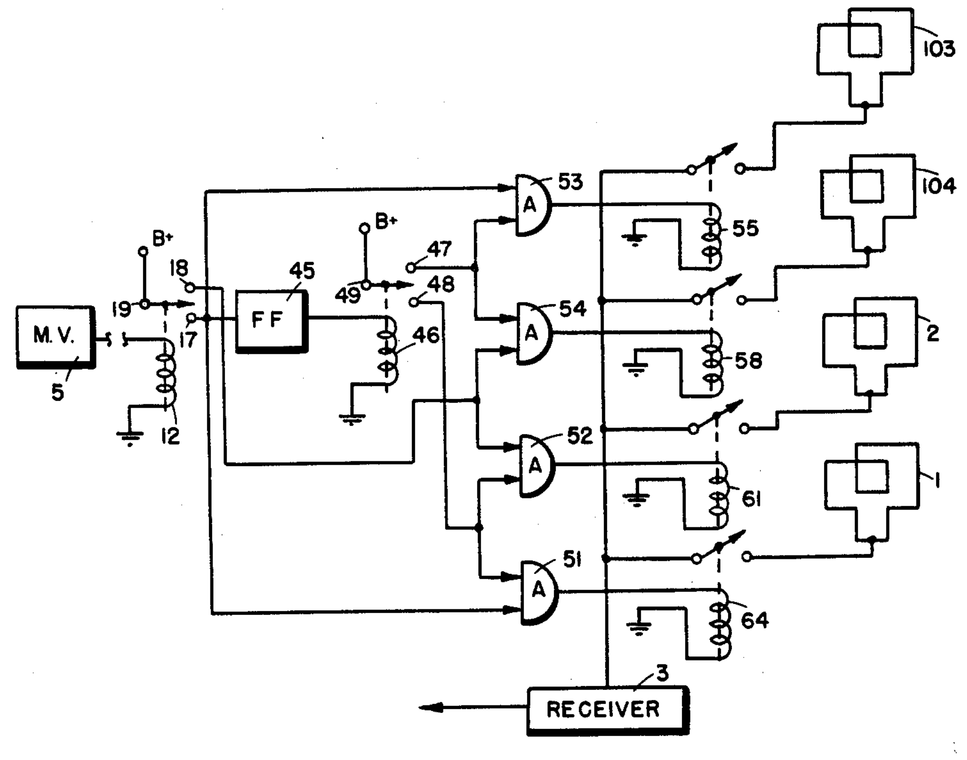
Fig. 4 is a schematic diagram showing a means for sampling more than two antennas.

Fig. 4 shows a method of sampling more than 2 antennas in the system, utilizing the combination of a series of AND gates with a bi-stable flip flop. An AND gate is a circuit which presents an output signal upon receiving two input signals. Four antennas are shown which are alternately sampled in sequence by receiver 3. Flip flop 45, which may be a standard multivibrator in which each input signal of a single polarity (such as the positive polarity shown) changes the state of the multivibrator, coupling the energized contact 17 of relay 12 through flip flop 45 to the coil of relay 46. Flip flop 45 alternately energizes and de-energizes relay 46 upon successive energizations of relay 12. Thus, when relay 12 is first energized, a positive polarity signal from B+ through energized contact 17 is applied to flip flop 45. Flip flop 45 changes states and produces an output signal of positive polarity which energizes relay 46. Then when relay 12 is de-energized, flip flop 45 remains in its present state being unaffected by the removal of this signal received from contact 17. Next, when relay 12 is energized, flip flop 45 changes states and produces an output signal of negative polarity which de-energizes relay 46. When relay 12 is then de-energized, flip flop 45 is unaffected. AND gates 51, 52, 53, and 54 are connected to the contacts of relays 12 and 46 in such a way as to successively energize relays 64, 61, 55, and 58 in successive order when relay 12 is alternately switching from contact 18 to contact 17 and the flip flop is alternately energizing and de-energizing relay 46. In operation, assuming that multivibrator 5 has just energized relay 12, flip flop 45 changes states and presents a signal to the coil of relay 46 energizing the relay and providing a signal to AND gates 51 and 52. Relay 12, through energized contact 17, provides a signal to AND gates 51 and 53. AND gate 51, being the only gate receiving two input signals, energizes relay 64 receiving a signal from energized contact 48 and contact 17, thereby connecting antenna 1 to receiver 3. Upon the next signal from multivibrator 5, relay 12 is de-energized. Flip flop 45 is unaffected and remains in a state where a signal is energizing relay 46. Contact 18 of relay 12 presents a signal to AND gates 52 and 54 and contact 48 of relay 46 still presents a signal to AND gates 52 and 51. Since AND gate 51 is no longer receiving a signal through contact 17, the gate will close and thus relay 64 is de-energized. AND gate 52 energizes relay 61, receiving a signal from contact 18 and contact 48, thereby connecting antenna 2 to receiver 3. Upon the next signal from multivibrator 5, relay 12 is energized. Flip flop 45 changes states, emitting a negative signal to relay 46 de-energizing the relay. AND gate 52 no longer receives a signal from contact 48 and AND gate 53 receives a signal from contact 17 and contact 47, thereby energizing relay 55 which connects antenna 103 to receiver 3. Upon the next signal from multivibrator 5, relay 12 is de-energized and relay 46 remains de-energized. AND gate 54 now receives a signal from contact 18 and contact 47 and relay 58 is energized thereby connecting the antenna 104 to receiver 3. The cycle is now complete, the four antennas being successively sampled and the next signal from multivibrator 5 will commence the sampling over again with antenna 1. Upon receipt by receiver 3 of a signal of usable level from any one of the antennas, multivibrator 5 is de-coupled from relay 12 by circuitry described in Fig. 2 and the selected antenna is locked to the receiver by the locking operation described in Fig. 2.

Figure 5:
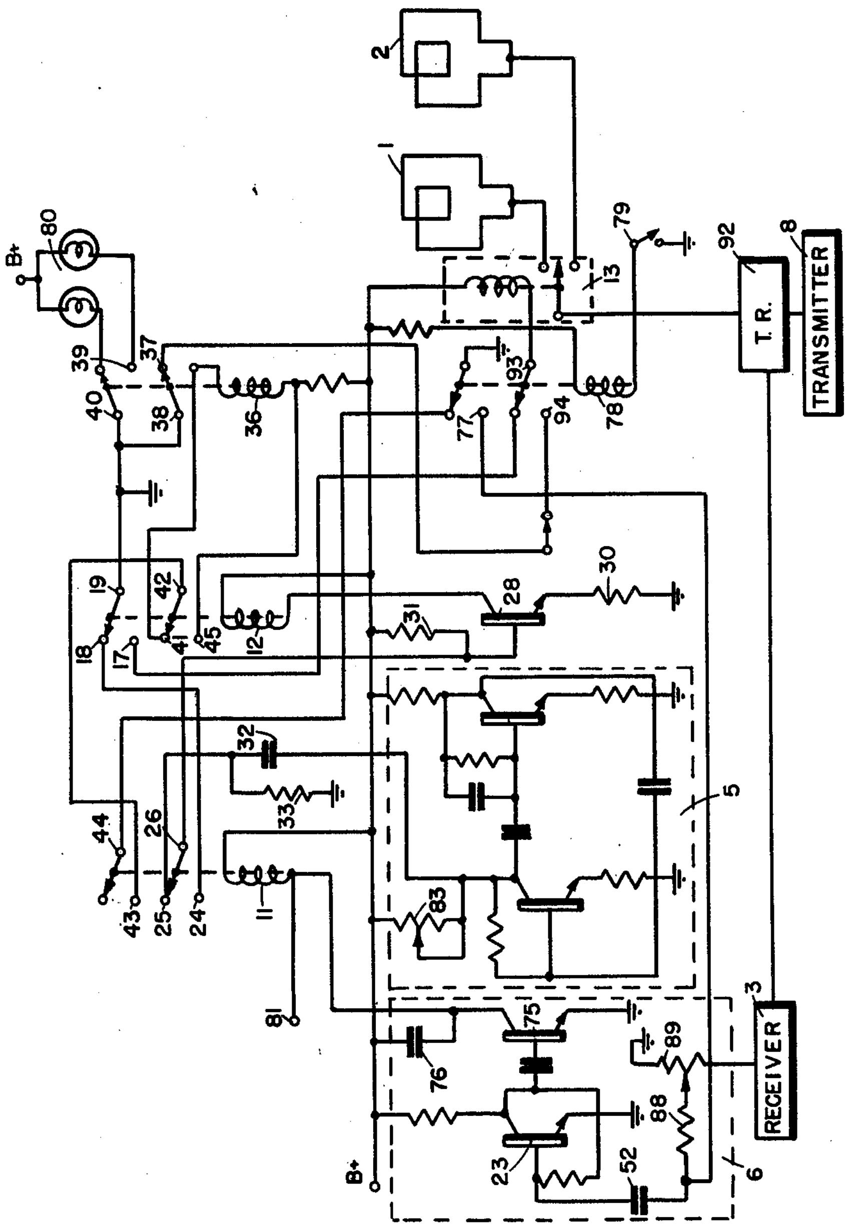
Fig. 5 is a schematic diagram of an operable embodiment of the invention.

Turning now to Fig. 5, a schematic diagram of an operable embodiment of the complete system is shown. Multivibrator 5 provides the switching signal to the antenna switching circuitry and is controlled in rate by the adjustment of resistor 83 in the collector circuit of one of the alternately conducting transistors of the multivibrator. The output from multivibrator 5 is coupled through capacitor 52 and contacts 25 and 26 of relay 11 in the de-energized position to the base of switching transistor 23. As multivibrator 5 alternately produces a positive and a negative output, transistor 23 alternately conducts and cuts off in response thereto. The output from transistor 23 is connected to the coil of relay 12 and alternately energizes and de-energizes relay 12 in accordance with the output signal from multivibrator 5. As relay 12 is alternately energized and de-energized, energized contact 17 connected through the de-energized contacts of transmitter relay 78 (to be described later) alternately energizes and de-energizes antenna switch relay 13 which alternately couples antennas 1 and 2 to receiver 3 and transmitter 8. Memory relay 36 provides a memory indication at indicator 80 which at all times provides the information to the pilot as to which antenna last produced a usable signal. Transmitter relay 78, responsive to a manual transmitter control signal provided by closing switch 79 removes the automatic sampling circuit from the system and connects transmitter 8 to the antenna last producing a usable signal. Thus, if antenna 1 last produced a usable signal, memory relay 36, de-energized as described in Fig. 3 provides a current path from B+ through the coil of relay 13 through energized contacts 93 and 94 of relay 78 and de-energized contacts 37 and 38 of relay 36 to ground, thus maintaining relay 13 energized and antenna 1 connected to transmitter 8. TR switch 92, a standard trans-receiver switch, automatically disconnects receiver 3 from the contacts of relay 13 when transmitting. A connection from the output of receiver 3 at one end of resistor 88 to terminal 77 of relay 78 grounds any output signal from receiver 3 when relay 78 is actuated by switch 79. This insures that receiver 3 will not be controlling the switching action when transmitter 8 is connected to one of the antennas.

Turning now to the operation of the system, it will be assumed in the beginning that antennas 1 and 2 are not producing a signal of usable level. Multivibrator 5 is coupled through de-energized relay 11 to transistor 23, which in turn is alternately energizing and de-energizing relay 12. Contact 17 is alternately opening and closing a circuit path for the coil of relay 13, thus relay 13 is being alternatively energized and de-energized. Antennas 1 and 2 are therefore being alternately sampled by receiver 3. Now assuming that one of the antennas produces a signal of usable level; if antenna 1, for example, provides a usable signal to receiver 3 when it is sampled, receiver 3 produces an output signal which is amplified by transistors 23 and 75 and presented to relay 11 which is energized thereby. The circuit between contacts 25 and 26 of relay 11 is broken, multivibrator 5 is de-coupled from the circuitry and the switching action of relays 12 and 13 ceases. Relay 12, being in the energized position when antenna 1 submits a signal to receiver 3, remains in energized position because of the condition of transistor 23, which is conducting enough to cause a current flowing through the coil of relay 12 to maintain relay 12 energized. This continued energization of relay 12 upon energization of relay 11, is affected by the elimination of the ground connection through resistor 33 to the base circuit of transistor 23 which thus has its base connected to B+ through resistor 31. Relay 12, being energized, in turn maintains relay 13 energized which in turn maintains antenna 1 coupled to receiver 3. Memory relay 36 is deenergized by the grounding of the B+ signal to one terminal of the coil of relay 36. Indicator 80 is energized through contact 37 and 38 providing information that antenna 1 is connected to receiver 3. Now assuming the pilot of the aircraft wishes to transmit, switch 79 is closed and transmitter 8 is connected to antenna 1 through relay 13. The output of receiver 3 is automatically decoupled from the control circuit when switch 79 is closed by the ground through control 77 of relay 78. De-coupling receiver 3 from the circuitry has no effect on switching relay 12 or memory relay 36. As long as switch 79 is closed transmitter 8 is connected to antenna 1 and the output of receiver 3 is de-coupled from the circuit. Next assume the pilot is no longer transmitting and wishes to receive any incoming signals. Assuming that no antenna is producing a usable signal, relay 11 is de-energized and multivibrator 5 is coupled to transistor 23 which resumes the switching of relay 12 and in turn switching relay 4. Antennas 1 and 2 are again alternately connected to receiver 3 until a usable signal is produced at either of the antennas at which time the receiver is locked on that antenna. Upon signal from switch 79, relay 78 de-couples receiver 3 from the circuit and transmitter 8 is connected to the antenna last producing the signal of usable level. In this manner, the pilot is always transmitting from the antenna which last received the usable signal.

In order to prevent the antenna switch from rapidly switching antennas 1 and 2 when the aircraft is flying through an area of severe nulls, capacitor 76 is inserted across the coil of relay 11 to provide a sufficient time delay between the output of the signal from receiver 3 and the energization of relay 11 to maintain the antenna last producing the usable signal level connected to receiver 3 until it is certain that antenna is no longer producing a usable signal. Terminal 81, connected to the coil of relay 11, provides an over-ride manual control of the system. When a signal is received from terminal 81 to provide a ground connection, relay 11 closes and disconnects the multivibrator from the switching operation. Relay 11 is also connected to terminal 81 to allow the incorporation of an external time delay holding circuit if so desired. Potentiometer 89, having a wiper connected through resistor 88 to capacitor 52 provides means for adjusting the level of the usable signal strength from the antennas. Moving the wiper varies the resistance of potentiometer 89 which varies the signal to capacitor 52 in response to the output from receiver 3. Thus the signal from receiver 3 which will operate to close relay 11 and initiate the locking action may be adjusted so that any desired level may be prescribed to energize relay 11. Therefore, it can now be seen that the signal from the antennas being sampled is in effect being continuously compared with a desired predetermined level, and when the signal reaches that level, relay 11 is energized and the antenna producing the usable level is locked on receiver 3.

The signal from the receiver which controls locking relay 11 may be, for example, the audio output of the receiver. Utilizing an audio signal permits a positive method of control. The same level of signal which is audible to the pilot of the aircraft as he is monitoring the receiver from a pair of head phones will actuate relay 11 and lock the antenna which produced the usable level signal on the receiver. Thus, the antenna providing the greatest signal strength can be automatically selected. Turning the gain down low on the receiver, until no signal is received causes switching back and forth between antennas. Slowly turning the gain up will cause the receiver to lock on the antenna of greatest signal strength. In the absence of such an audible receiver output, the antennas are sampled alternately as described.

An antenna selector system has been described which is fully automatic requiring no action from the pilot. A usable signal from any of a series of antennas is automatically locked to the receiver and should the signal fade, the system automatically resumes sampling without any knowledge or action on the part of the pilot required.

The antenna selector system of this invention may be utilized in any communication system which requires more than one antenna to provide adequate coverage. For example, in an aircraft besides the command radio communication system, any of the other communication systems such as secondary command, radar, etc. can use the device of this invention.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An automatic reception system comprising a plurality of antennas, a receiver, switching means for cyclically coupling said receiver to said antennas alternately, signal selecting means responsive to said receiver and controlling said switching means for individually coupling one of said antennas to said receiver, and means connected to be responsive to a signal of predetermined strength at said antennas as measured by said receiver to control said signal selecting means whereby the antenna which first produces a signal of said predetermined strength is coupled to said receiver, means for disconnecting the control of said switching means by said receiver through said signal selecting means, and means responsive to said means for disconnecting, controlling said switching means to cease its cyclical coupling.

2. In a communication system, a plurality of antennas responsive to radio frequency energy, a receiver, means for coupling said antennas to said receiver, said means comprising means for generating a cyclically varying signal, switch means responsive to said signal for alternately connecting said antennas to said receiver, through said coupling means, control means operatively connected to disconnect the output of said receiver from said coupling means, and memory means responsive to said control means disconnecting the output of said receiver, said memory means controlling connection from said receiver to the antenna last providing a signal of predetermined strength.

3. In a communication system for receiving radio-frequency energy, the combination of a pair of antennas, a receiver, a first relay connected to couple one of said antennas to said receiver when energized and connected to couple the other of said antennas to said receiver when de-energized, a multivibrator for generating a cyclically varying signal, a second relay responsive to said multivibrator for alternately de-energizing and energizing said first relay, a third relay connected to disengage said multivibrator from said second relay when energized, means connecting said receiver to said third relay for energizing said third relay when one of said antennas has an output of predetermined value, and locking means for maintaining said second relay in an energized position when one of said antennas has an output of predetermined value and maintaining said second relay in a de-energized position when the other of said antennas has an output of predetermined value.

4. The system of claim 3 wherein said locking means comprises a transistor having its collector emitter circuit connected to provide an energizing current path for said second relay, the base of said transistor connected to receive a signal from said multivibrator to cause said transistor to alternately conduct and non-conduct when said third relay is de-energized, means for maintaining a conductive bias on the base of said transistor when said second relay is energized and said third relay is de-energized, and means for maintaining a cutoff bias on the base of said transistor when said second and third relays are de-energized.

5. A communication system comprising a plurality of antennas, a plurality of input channels each adapted to provide an input signal of variable value from said antennas, transmitter and receiver means, sampling means responsive to said input signals for providing a sampling signal having successive portions each having a value respectively indicative of the value of an individual one of said input signals, and means responsive to a predetermined value of one portion of said sampling signal for locking to said transmitter and receiver means the input channel individual to said one signal portion.

6. In a communication system, a plurality of antennas responsive to radio frequency energy, a receiver, means for coupling said antennas to said receiver, said means comprising means for generating a cyclically varying signal, switch means responsive to said signal for alternately connecting said antennas to said receiver, means operatively connected to effect disengagement of said cyclically varying signal from said switching means when one of said antennas has an energy output of predetermined value, a transmitter, and means for connecting said transmitter to the antenna with an energy output of predetermined value.

7. An automatic reception system comprising a plurality of antennas, a receiver, switching means for cyclically coupling said receiver to said antennas alternately, signal selecting means for individually coupling one of said antennas to said receiver, a transmitter, means responsive to a predetermined signal strength at said antennas to control said signal selecting means whereby the antenna which first produces a signal of said predetermined strength is coupled to said receiver, and memory switching means responsive to said control means for coupling said transmitter to the antenna which last produced a signal of said predetermined strength.

8. An automatic receiver system comprising a receiver, a plurality of antennas operatively associated with said receiver, means for alternately coupling said receiver to said antennas, selective means for individually coupling any one of said antennas to said receiver, control means responsive to said receiver for controlling said selective means to couple the antenna with the greatest signal strength to said receiver, a transmitter, and means responsive to said control means for coupling said transmitter to the antenna last producing the greatest signal strength.

References Cited in the file of this patent

UNITED STATES PATENTS 2,136,621 King et al. ------------ Nov. 15, 1938